US010684601B2

(12) United States Patent
Butler (10) Patent No.: US 10,684,601 B2
(45) Date of Patent: Jun. 16, 2020

(54) MACHINE CONTROL AND DATA LOGGING STATION

(71) Applicant: David J Butler, Cotuit, MA (US)

(72) Inventor: David J Butler, Cotuit, MA (US)

( * ) Notice: Subject to any disclaimer, the term of this patent is extended or adjusted under 35 U.S.C. 154(b) by 0 days.

(21) Appl. No.: 15/865,216

(22) Filed: Jan. 8, 2018

(65) Prior Publication Data

US 2019/0011895 A1    Jan. 10, 2019

Related U.S. Application Data

(63) Continuation-in-part of application No. 14/681,970, filed on Apr. 3, 2015, now abandoned, which is a
(Continued)

(51) Int. Cl.
| | |
|---|---|
| G05B 19/042 | (2006.01) |
| B23D 59/00 | (2006.01) |
| F16P 3/14 | (2006.01) |
| G07C 3/08 | (2006.01) |
| F16P 3/02 | (2006.01) |
| F16P 3/12 | (2006.01) |
| B26D 5/00 | (2006.01) |
| B23Q 11/00 | (2006.01) |

(52) U.S. Cl.
CPC ....... *G05B 19/0428* (2013.01); *B23D 59/001* (2013.01); *F16P 3/02* (2013.01); *F16P 3/12* (2013.01); *F16P 3/14* (2013.01); *G07C 3/08* (2013.01); *B23Q 11/0078* (2013.01); *B26D 5/005* (2013.01); *G05B 2219/24024* (2013.01); *G05B 2219/25257* (2013.01); *Y10T 83/081* (2015.04); *Y10T 83/099* (2015.04); *Y10T 83/207* (2015.04)

(58) Field of Classification Search
CPC ............ G05B 19/0428; G05B 19/0425; G05B 2219/24; G05B 2219/24024
See application file for complete search history.

(56) References Cited

U.S. PATENT DOCUMENTS

| | | | |
|---|---|---|---|
| 4,405,829 A | 9/1983 | Rivest et al. ................. | 178/22.1 |
| 5,058,028 A * | 10/1991 | Meyerle ........... | G05B 19/41865 700/169 |

(Continued)

OTHER PUBLICATIONS

Wikipedia, "Advanced Encryption Standard," Apr. 17, 2018, pp. 1-9.

(Continued)

*Primary Examiner* — Nathaniel J Kolb
(74) *Attorney, Agent, or Firm* — Caldwell Intellectual Property Law, LLC (57) ABSTRACT

A machine control and data logging station, intended for use with a saw or other machine tool, features a processor which monitors a number of input lines, a real time clock and time stamp function. Any change of input signals from the machine tool will be recorded in flash memory. Both wired and wireless outputs may read the memory at any given time. Optionally, hardware or software data communication encryption may be employed to provide increased confidentiality and security. The station continually monitors sensor inputs and can react automatically to emergency-stop the machine tool upon sensing a dangerous condition.

7 Claims, 10 Drawing Sheets

Related U.S. Application Data continuation-in-part of application No. 13/337,279, filed on Dec. 26, 2011, now abandoned.

(60) Provisional application No. 61/977,019, filed on Apr. 8, 2014.

(56) References Cited

U.S. PATENT DOCUMENTS

| | | | | |
|---|---|---|---|---|
| 5,724,428 | A | 3/1998 | Rivest | 388/37 |
| 5,835,600 | A | 11/1998 | Rivest | 380/44 |
| 5,917,726 | A * | 6/1999 | Pryor | G05B 19/41875 29/712 |
| 6,418,829 | B1 * | 7/2002 | Pilchowski | B23D 59/001 83/397 |
| 6,615,091 | B1 * | 9/2003 | Birchenough | B65G 37/02 700/20 |
| 7,171,281 | B2 * | 1/2007 | Weber | B65G 37/02 700/20 |
| 7,831,323 | B2 * | 11/2010 | Weber | B65G 37/02 700/20 |
| 8,140,358 | B1 | 3/2012 | Ling | 705/4 |
| 8,311,858 | B2 | 11/2012 | Everett et al. | 705/4 |
| 8,595,034 | B2 | 11/2013 | Bauer et al. | 705/4 |
| 2002/0017176 | A1 * | 2/2002 | Gass | B23D 47/08 83/13 |
| 2003/0158615 | A1 * | 8/2003 | Weber | B65G 37/02 700/96 |
| 2004/0226424 | A1 * | 11/2004 | O'Banion | B23D 47/08 83/397 |
| 2005/0188859 | A1 * | 9/2005 | Bruce, III | G01N 21/359 99/486 |
| 2006/0026672 | A1 * | 2/2006 | Braun | G07C 9/22 726/9 |
| 2007/0112912 | A1 * | 5/2007 | Weber | B65G 47/5122 709/203 |
| 2011/0035037 | A1 * | 2/2011 | Weber | B65G 37/02 700/96 |
| 2011/0056344 | A1 * | 3/2011 | Dick | B23D 45/14 83/13 |
| 2013/0001028 | A1 * | 1/2013 | Calliari | B23Q 11/0082 188/110 |
| 2013/0319196 | A1 * | 12/2013 | Schmeiser | B26D 5/02 83/34 |
| 2014/0357295 | A1 * | 12/2014 | Skomra | G06Q 10/08 455/456.1 |
| 2015/0158097 | A1 * | 6/2015 | Myrfield | B23D 55/046 83/13 |

OTHER PUBLICATIONS

Wikipedia, "ESP8266," Apr. 24, 2018, pp. 1-7.
Wikipedia, "IEEE 802.15.4 Technical Standard," Jan. 29, 2018, pp.

* cited by examiner

MACHINE RUN CYCLE

EMERGENCY OFF (EMO) CYCLE

MACHINE CONTROL AND DATA LOGGING STATION

CROSS-REFERENCE TO RELATED APPLICATION(S)

This application is a continuation-in-part of my pending U.S. Ser. No. 14/681,970 filed 2015 Apr. 8 and also claims priority from my provisional application U.S. Ser. No. 61/977,019 filed 8 Apr. 2014, and is a continuation-in-part of my Ser. No. 13/337,279, filed 26 Dec. 2011, the entire contents of which are incorporated by reference.

FIELD OF THE INVENTION

The present invention relates generally to logging operational data of a machine and, more specifically, to detecting and minimizing unsafe practices while using a machine tool. It addresses the need to improve the safety record of existing machine tools which are potentially hazardous to the machine operator through a modular field installable system consisting of guards, sensors, remote communication together with "black box" chronological data logging functions, as well as the need for an "emergency stop" function for the machine. The scope of hazardous machine tools includes operator injury hazards posed by cutting blades, stamping forces, crushing operations and all similar machine tool features or components that may lead to serious operator injury. Given the state of contemporary micro-technology leading to the "Internet of Things" (IoT), the present invention is an example of such cost-effective advances.

BACKGROUND

Many types of consumer-grade and industrial-grade machine tools pose consequential danger to operators who are either unaware of safe practices, not sufficiently experienced in the machine's use, or who have developed generally unsafe operating practices. The table saw is a prime example of such machines, as reflected by their grim safety record over the past century. Other examples of such machine tools are: broaching machines; drill presses; gear shapers; hobbing machines; hones; lathes; screw machines; milling machines; sheet metal shears; shapers; saws; planer; Stewart platform mills; grinding machines and pallet disassemblers.

Safety features such as blade guards are provided by machinery manufacturers; however, often it is not possible to review a machine's operating history including the use of safety guards, the frequency of operation and other parameters. After a serious accident occurs, it is usually not possible to review the history of the machine's operation and the safety configuration at the time of an accident, including whether or not the recommended safety guards were in use. The result of this lack of operating data is needless speculation, during subsequent product liability litigation, about how to allocate fault between the operator and the manufacturer for a given injury, leading to difficult-to-predict damage awards. Injury statistics over the last decade indicate the "status quo" leads to table saws alone causing at least ten amputations per day in the United States, which represents its own societal cost, in excess of 2.5 billion dollars.

Micro-technology advances have made it possible to economically monitor existing machine tools to record and improve operator safety through knowledge gained from long-term "black-box" data logging as well as through providing precise micro-control of an emergency motor braking feature. In addition to countless industrial machines, the universe of such machines has been shown to include consumer-grade machines such as table saws near the midpoint of the high-end of the price spectrum. The operating history summary may also be displayed, to further warn machine operators if basic safe practices are not being followed. All machine status changes are recorded and may be reviewed, and the complete log read, externally at any time. The monitoring equipment can be configured to generate warnings to recommend and/or require that safe operating practices be followed.

In the event of an injury or incident requiring review, the machine may be remotely disabled, pending an investigation. The recorded history of the subject machine may also be read at any time for analysis by employers, insurance carriers or other stakeholders. Employment of the device of the present invention is expected to be solely at the discretion of the machine tool owner.

DESCRIPTION OF THE RELATED ART

Many are aware of the analogous aviation-event recorders colloquially known as a "black box" function. The term "black-box" is also commonly used as a simplified description of an electronic device with inputs and outputs which performs functions which is not necessary to describe in detail in the context of use. Aircraft black boxes are intended to survive an aircraft accident and provide information about the combination of events leading to the accident. These devices have been in use since the 1960s and have proven extremely useful, in spite of never being colored black. See Boniface U.S. Pat. No. 3,327,067. The US auto industry has been installing vehicle event recorders for more than a decade; see U.S. Pat. Nos. 8,311,858 and 8,595,034. The National Highway Transport Safety Administration (NHTSA) of the US government has mandated that all light vehicles in the United States manufactured after Sep. 1, 2012 include an event data recorder that records a minimum set of data elements. Also, a recently widely advertised safe driver device is described in Progressive Casualty Insurance Company's U.S. Pat. Nos. 8,140,358 and 8,595,034. Chinese Patent Publication CN 203,045,843 filed Dec. 15, 2012, published Jul. 10, 2013, describes a device for a panel cutting machine with a monitoring and protecting device.

SUMMARY OF THE INVENTION

A first embodiment of the present invention is equipment to capture and display key parameters relating to a given machine tool's operating history, especially with regard to safety practices that will facilitate operator training. An object of the invention is to unobtrusively store a machine's operating history, including that information which will be relevant to a potential worker's compensation claim or any personal injury litigation. Evidentiary accident reconstruction data relating to the machine history, and the particular incident involved, may be useful in such cases. In addition, collecting a machine's long term operational data will greatly assist organizations in making capital equipment deployment decisions.

For convenience of the reader, components shown in the figures are listed here with their reference numerals:

| | | |
|---|---|---|
| 1. | Machine Control and Data Logging Station | FIGS. 1, 2, 9, 10 |
| 2. | Machine Tool | 1 |
| 3. | Machinery | 1 |
| 4. | Guards and Sensors | 1, 3, 9, 10 |
| 5. | Sensor Electronics | 1 |
| 6. | Machine Power Control | 1, 2, 3 |
| 7. | Emergency Motor Braking | 1 |
| 8. | Microcontroller | 1, 2, 4, 6, 7 |
| 9. | Flash Memory | 1, 2, 6 |
| 10. | Battery Backup | 1, 2 |
| 11. | Serial Port | 1, 2, 7 |
| 12. | WiFi Wireless Module | 1, 2, 8 |
| 13. | Optional Sensor Modules | 2 |
| 14. | Keyed Safety Override Switch | 3 |
| 15. | "A" Safety Relay | 3 |
| 16. | "B" Safety Relay | 3 |
| 17. | DC Bridge Rectifier | 3 |
| 18. | Solid State Relay | 3 |
| 19. | Proximity/Touch Flesh Sensor(s) | 3, 9, 10 |
| 20. | Proximity/Touch Sensor Circuit | 4 |
| 21. | LM7805 +5 Voltage Regulator | 4 |
| 22. | Hold Relay | 4 |
| 23. | AQV212 Driver Circuit | 4 |
| 24. | WiFi Precision Timer | 8 |
| 25. | WiFi Module Header Circuit | 8 |
| 26. | Machine Operator Display | 9, 10 |
| 27. | Exemplary Band Saw | 9 |
| 28. | Exemplary Table Saw | 10 |
| 29. | Exemplary Machine State Indicators | 10 |
| 30. | Operator ARM Pushbutton Switch | 10 |
| 31. | Blade Guard Lighting Switch | 10 |
| 32. | Real Time Clock Circuit | 1, 2, 6 |
| 33. | Exemplary Machine Guard Support | 10 |

DETAILED DESCRIPTION

Figure 1:
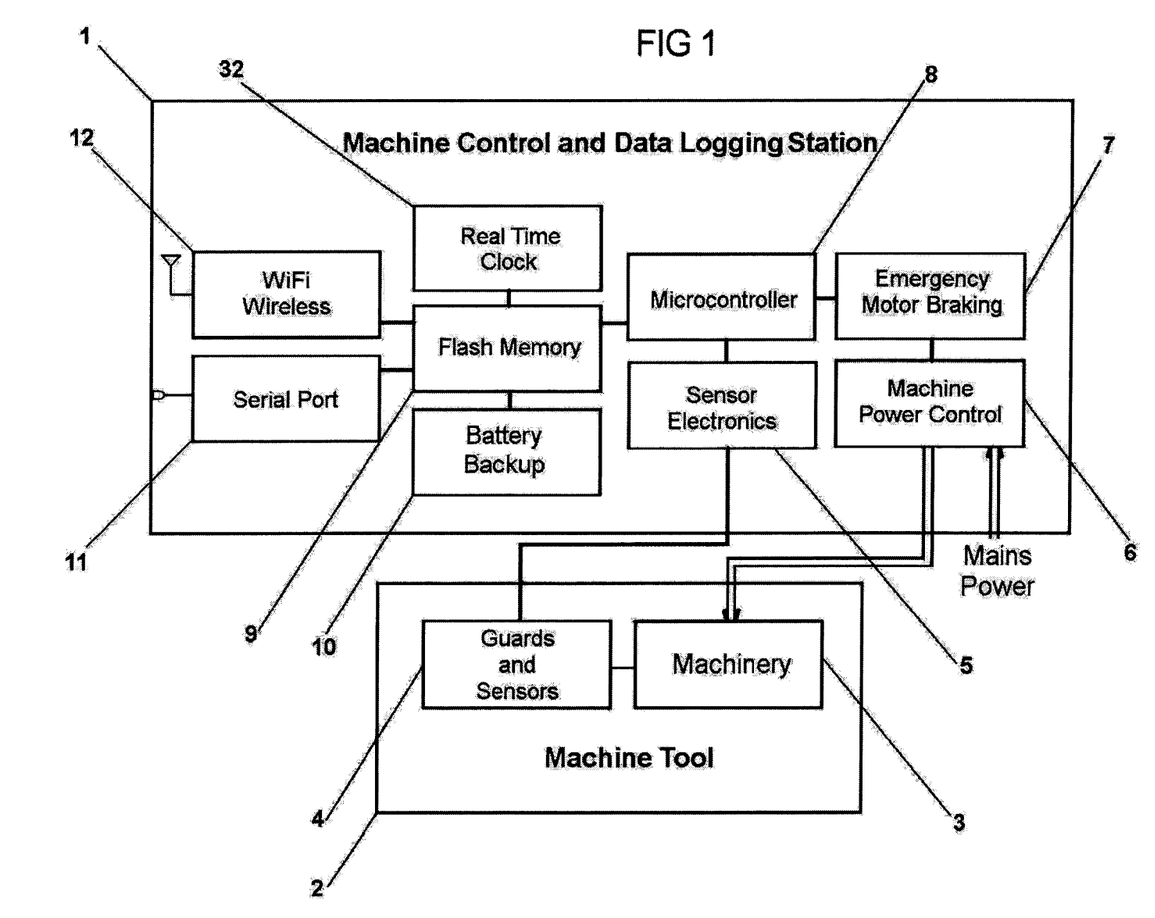
FIG. 1 is a block diagram of a Machine Control Station and Data Logging Station which is based upon the machine control station FIG. 1 as previously described in my application Ser. No. 13/244,376, now U.S. Pat. No. 8,336,432, granted 2012 Dec. 25, which forms the baseline of the present invention.
Figure 2:
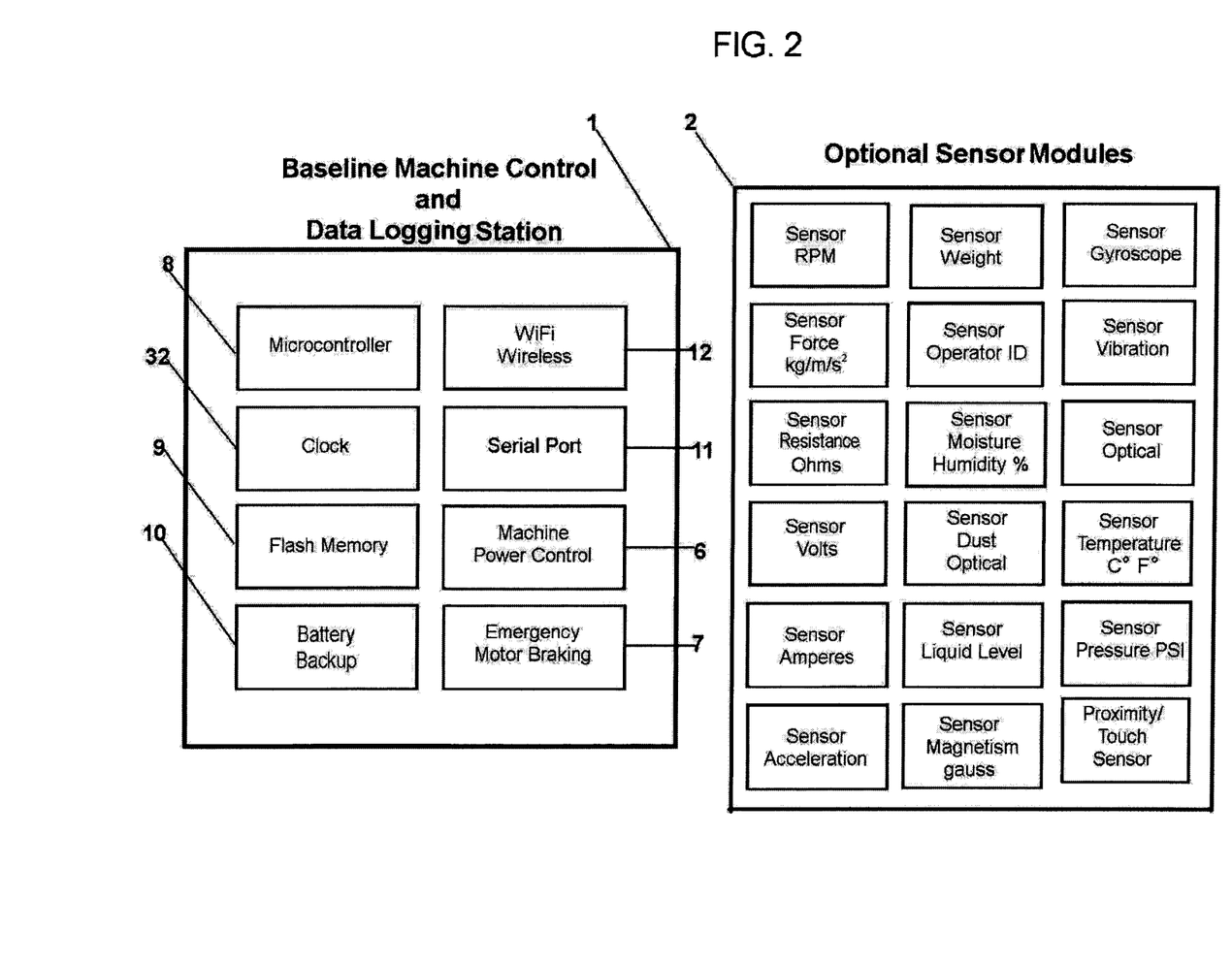
FIG. 2 is a block diagram of the present invention which depicts a group of optional sensor modules available today.

The present invention includes a data acquisition and chronological event recorder (1) that is coupled to a machine control device, such as disclosed in my earlier U.S. Pat. No. 8,336,432, which is depicted herein as FIG. 1 and is exemplary of the physical implementation described in the present invention. This invention introduces additional functionality, including more precise microprocessor control into the machine control device with event recording and long term data logging capability. FIG. 2 depicts the functionality added to the Machine Control Station (1) of the present invention. The machine tool being controlled and monitored (2) has appropriate guards and sensors (4) installed with electrical connection to the microcontroller (1) and sensor electronics (5) within the machine control station (1). There are a variety of suitable microprocessors and microcontroller devices available for this technical application. Some microcontroller examples are ATMEL AT mega series such as (8); Cypress PSoC series; Microchip MCS series; and the NXP Cortex M3 series. The Texas Instruments MSP 430 series represents the types of common devices that fit the representative microprocessor category. Sensor electronics (5) are also widely available and examples are: time (UTC); temperature (F.° C.°); liquid or gas pressure (PSI); linear motion speed (FPS); rotational speed (RPM); operator ID; proximity/touch sensor; moisture; liquid; acceleration; weight; incline; voltage; current resistance; magnetism; position; proximity; vibration; optical; force; audio; dust.

Machine Power and Braking Circuits (6) and mains power switching are controlled by the microcontroller, in response to operator actions and through the sensor electronics (5) when a flesh-detection circuit triggers an emergency stop of the machine tool (7). The invention preferably also employs an associated memory capability suitable for long-term data storage. The memory can be random-access, read-only, or a combination of both. Current flash memory (9) technology is exemplified by SD (secure data) format such as SDSC, SDHC, and SDXC but other memory technology may be used.

These types of widely used systems and devices can incorporate encryption/decryption using well-known standard approaches disclosed by Rivest, Shamir and Adleman of MIT (U.S. Pat. Nos. 4,405,829, 5,724,428 and/or 5,835.600), commercialized by RSA Data Security, and others such as Gilisoft. Gilisoft is but one example of simple password encryption which provides basic security to prevent tampering with the subject machine tool and its monitoring and control circuits, and is believed to provide sufficient security for the machine control and data logging station disclosed herein. More complex solutions are also available, such as the Advanced Encryption Standard [AES] adopted on 2002-05-26 by the US National Institute of Standards & Technology (NIST). AES is included in the ISO/IEC 18033-3 international standard, as stated in the WIKIPEDIA online encyclopedia. AES is commercially available in SSD (Solid State Drive) storage devices such as the INTEL models 320 and 530, should a system designer choose to specify a higher minimum level of security.

The machine control unit configuration preferably incorporates battery backup power (10) to enable retention of data operation for an extended period without line or mains power. These devices are in common use in computer backup and other devices, in order to supply very low power to maintain real-time clocks in computers. Lithium button battery cells such as CR2032 or BR2032 are commonly used in such applications. The invention also includes external communications interface circuits (11) and (12) which can communicate as programmed by the microcontroller. The wireless Circuit (12) may connect directly to a wireless network such as Wi-Fi, IEEE 802.11 or ZigBee IEEE 802.15.4 or similar standard if desirable. A direct-readout universal serial bus port (11) may also be provided and might prove necessary in an electrically noisy factory or similar environment. Digital communication methods such as Ethernet (11) could be employed.

Figure 3:
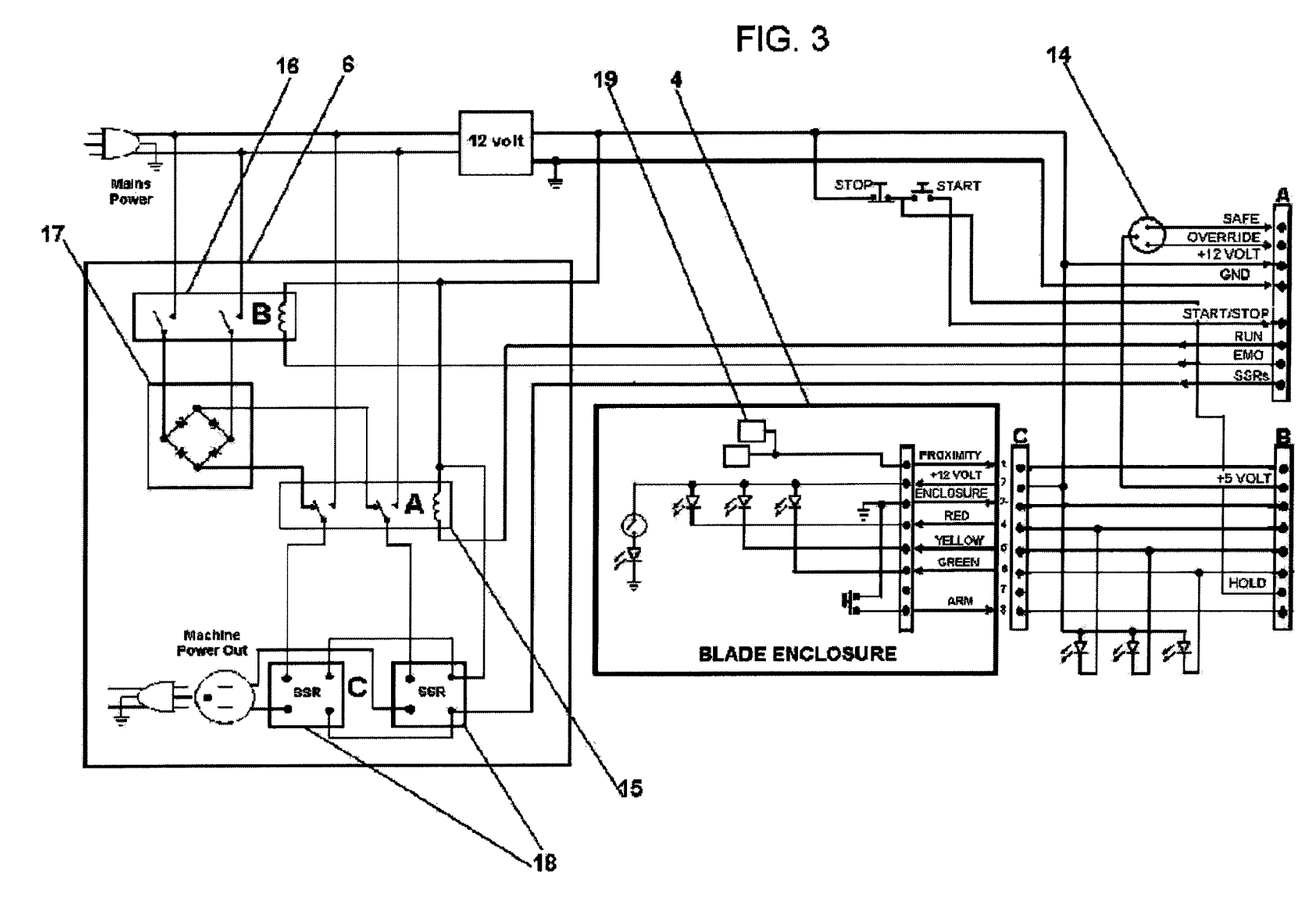
FIG. 3 is a schematic representation of the power control and emergency braking system.

FIG. 3 further depicts machine power control (6) including a blade enclosure (4) with proximity/touch sensor(s) (19). A keyed safety-override switch (14), as shown, will allow the machine to operate without engaging any of the safety features provided. Mechanical relays 15 and 16 are safety devices, intended to prevent inadvertent machine operation, in case of a failure of a solid state relay SSR (18), normally used to keep the machine from operating. A bridge rectifier (17) provides DC current used for emergency braking of the machine motor. Many other semiconductor devices may also be employed to provide DC power, such as silicon-controlled rectifiers (SCR), thyristors, and Insulated Gate Bipolar Transistor (IGBT) devices. Based upon the amount of power to be injected, in order to stop a particular motor, a circuit designer would select a suitable electronic component.

Figure 4:
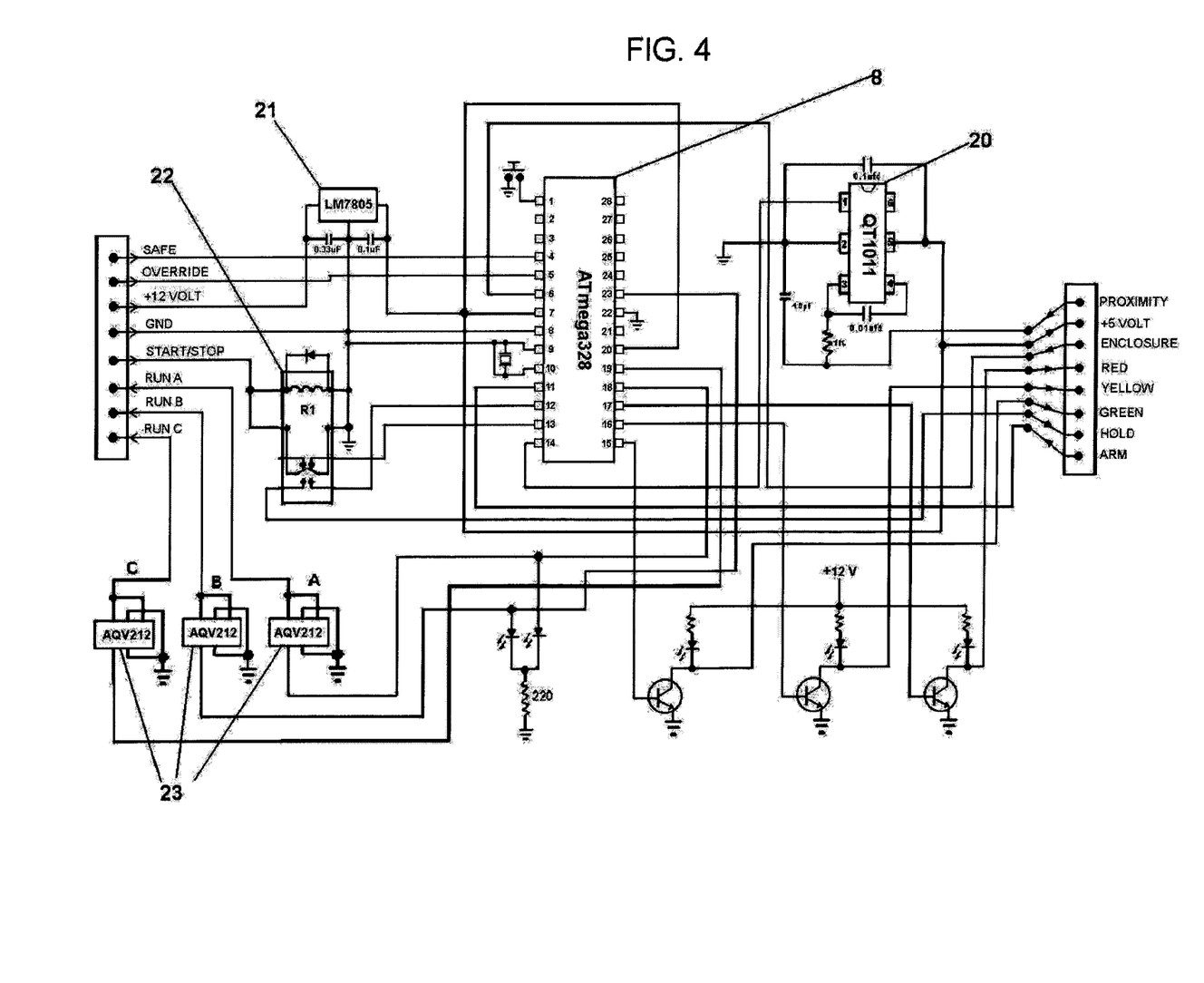
FIG. 4 is a schematic representation of a microcontroller section of the invention.
Figure 5:
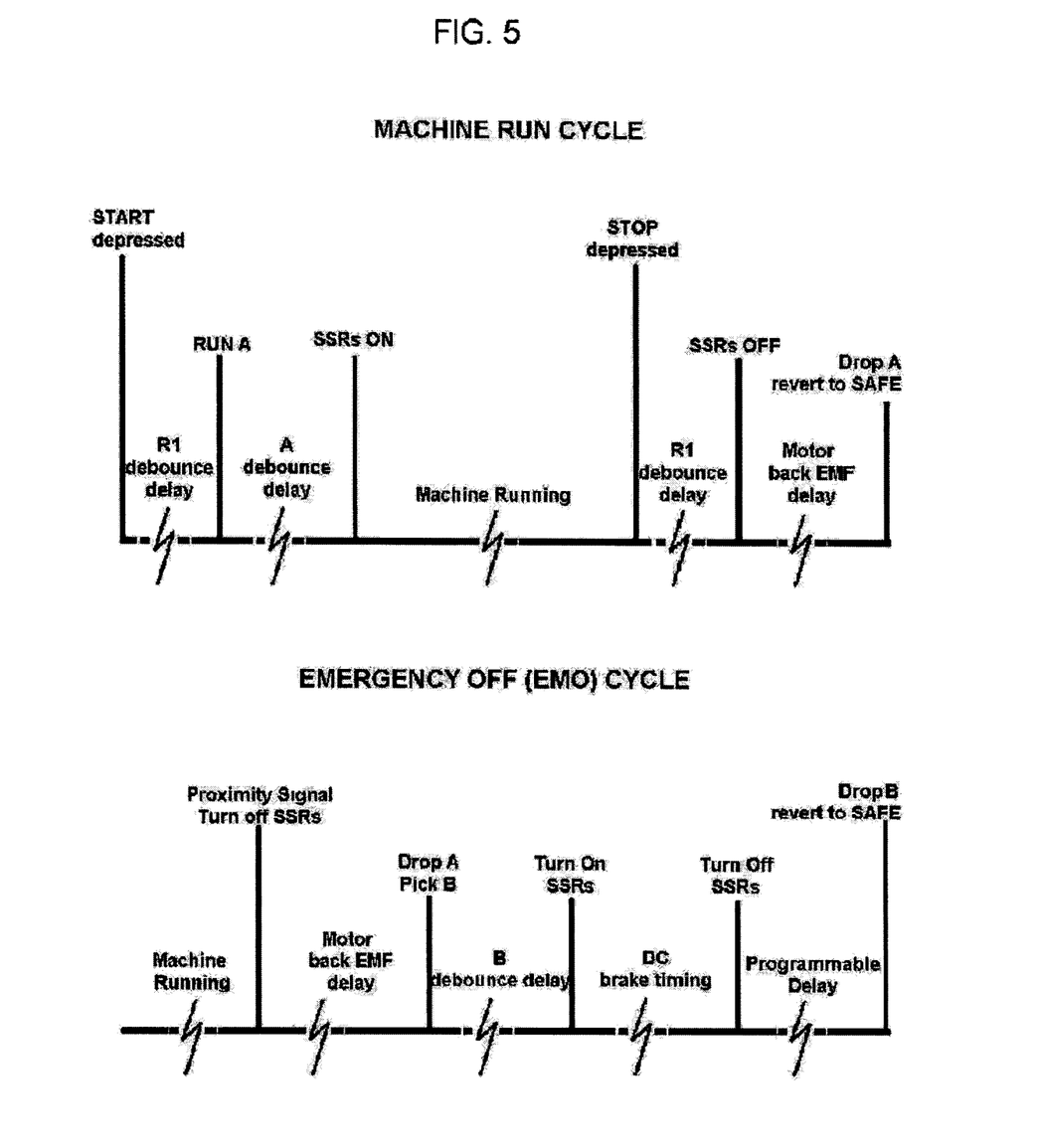
FIG. 5 illustrates timing charts of the basic microcontroller functions.

FIG. 4 depicts an electronic circuit which directly connects to the FIG. 3 circuit. It includes the microprocessor (8); a capacitive touch or proximity sensor (20), a +5 volt regulator (21) and a hold relay (22) which is wired in series with the start and stop machine power pushbuttons. FIG. 5 depicts both the machine's run, as well as the emergency off EMO cycle. FIG. 5 illustrates the essential need for a microcontroller in this invention. The variable timing and delay conditions shown are of paramount importance, in both running and in emergency stopping of the induction motors which are employed in most machine tools.

Figure 6:
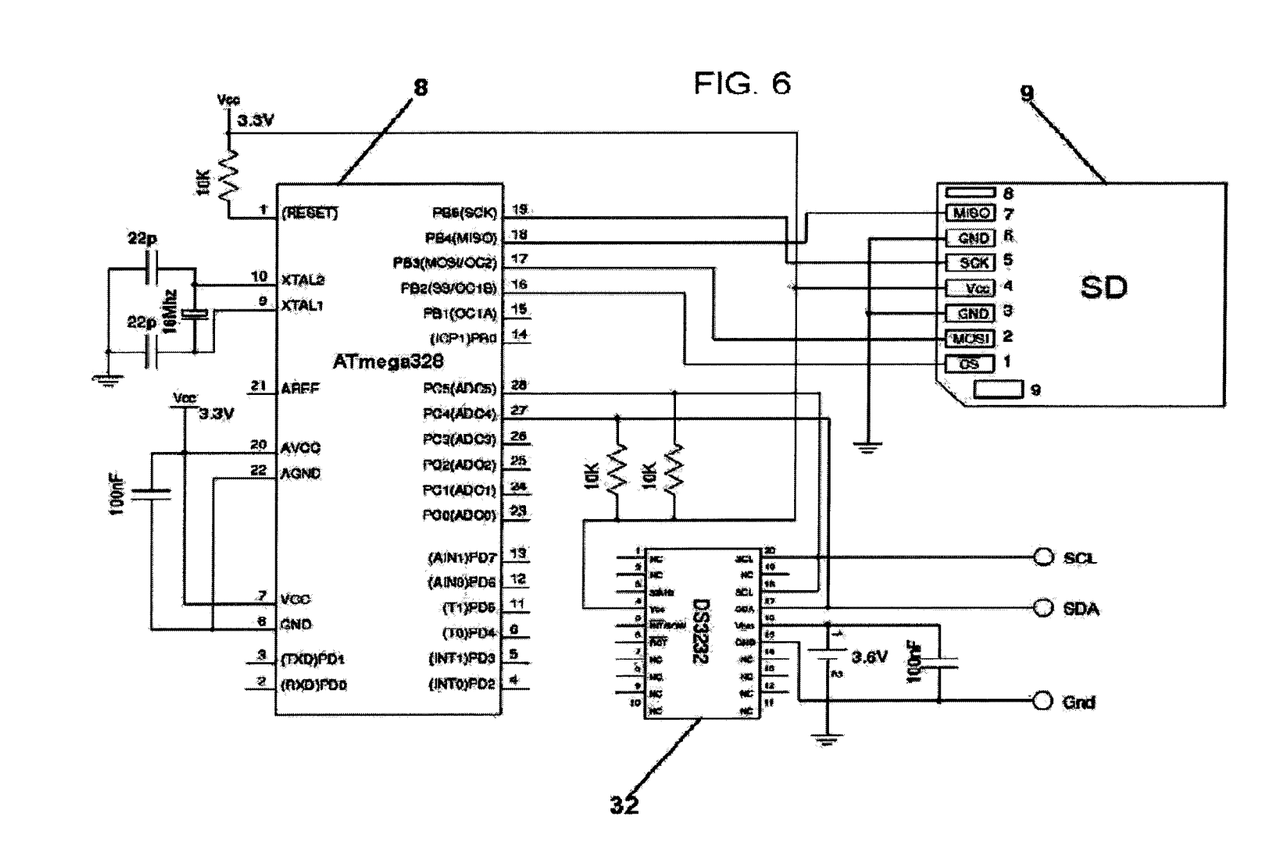
FIG. 6 is a schematic diagram of a flash memory and real time clock of the invention.

The diagrams show: relay de-bounce delays; motor back-EMF delay and DC-injection brake-timing delays. The relays employed herein are mechanical safety backup devices to prevent operations which might result from a semiconductor failure, and require debounce timing delay. The motor back-EMF delay and DC brake-timing delays are very important to time precisely, for a given motor and application, and the microcontroller can be programmed to provide precision which cannot be obtained using fixed components. If the timing is too short, the motor braking will take too long; but if the timing is too long, the motor may suffer damage over prolonged use. FIG. 6 is a schematic of a SANDISK SD flash memory card (9) interfaced with the microcontroller (8). Also shown is the real-time clock (32), which is necessary for maintaining a chronological history of events being recorded with flash memory.

Figure 7:
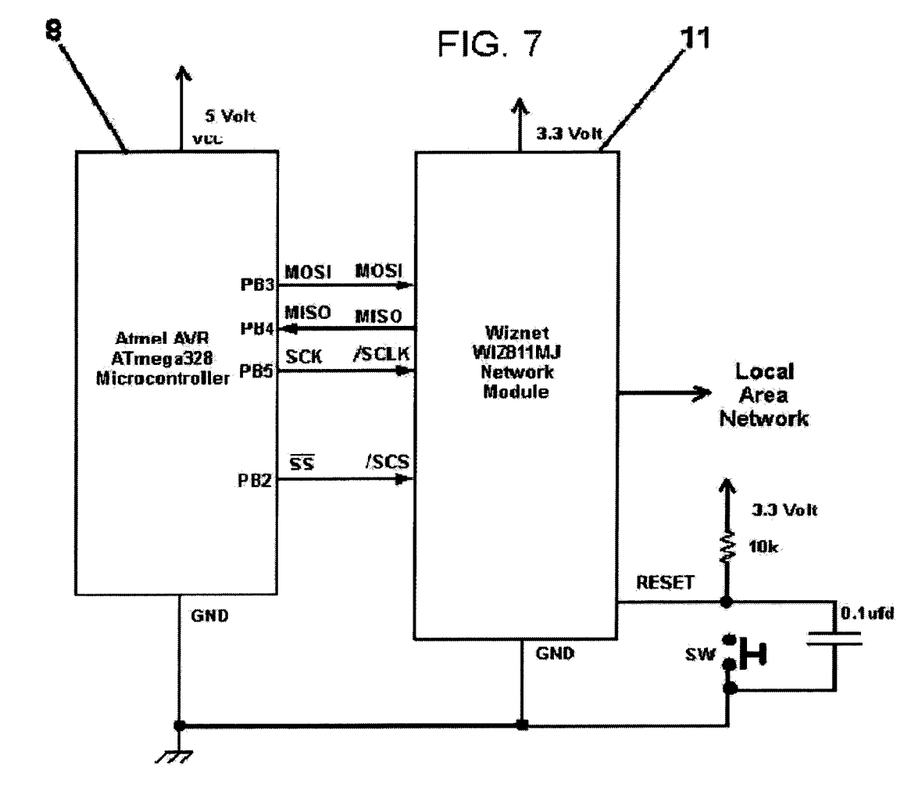
FIG. 7 is a diagram of a hard-wired Ethernet serial port for the present invention.

FIG. 7 shows a network adapter (11) for connecting the machine control and data logging station to an Ethernet port. This feature may prove necessary in some electrically noisy machine tool environments.

Figure 8:
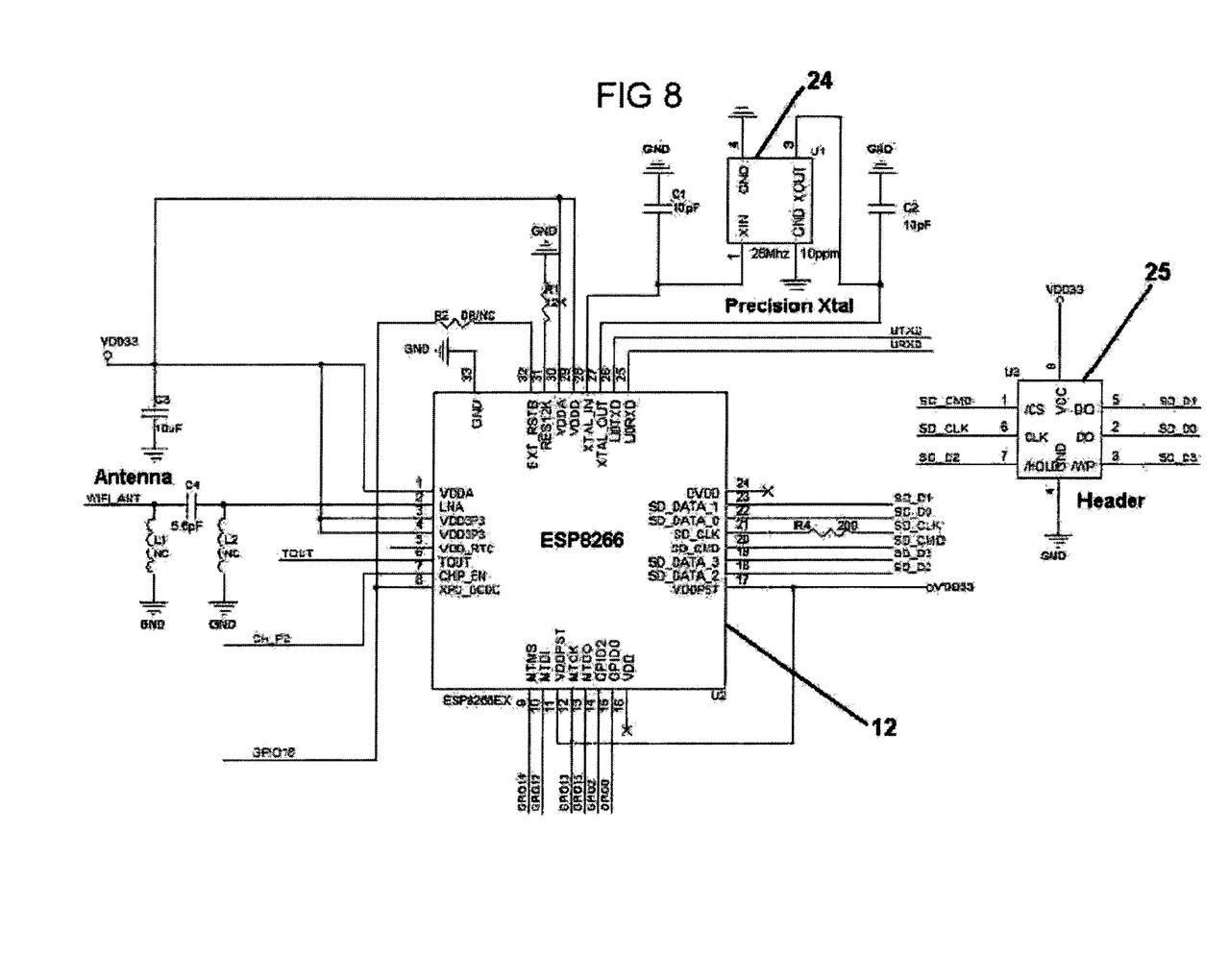
FIG. 8 is a diagram of a WiFi wireless communication system.

FIG. 8 (12) represents an exemplary WiFi transceiver micro circuit ESP8266 and supporting circuitry in a modular format including antenna, precision crystal (24) and interface header (25), available from Seed Technology Ltd. of Shenzhen, China.

Figure 9:
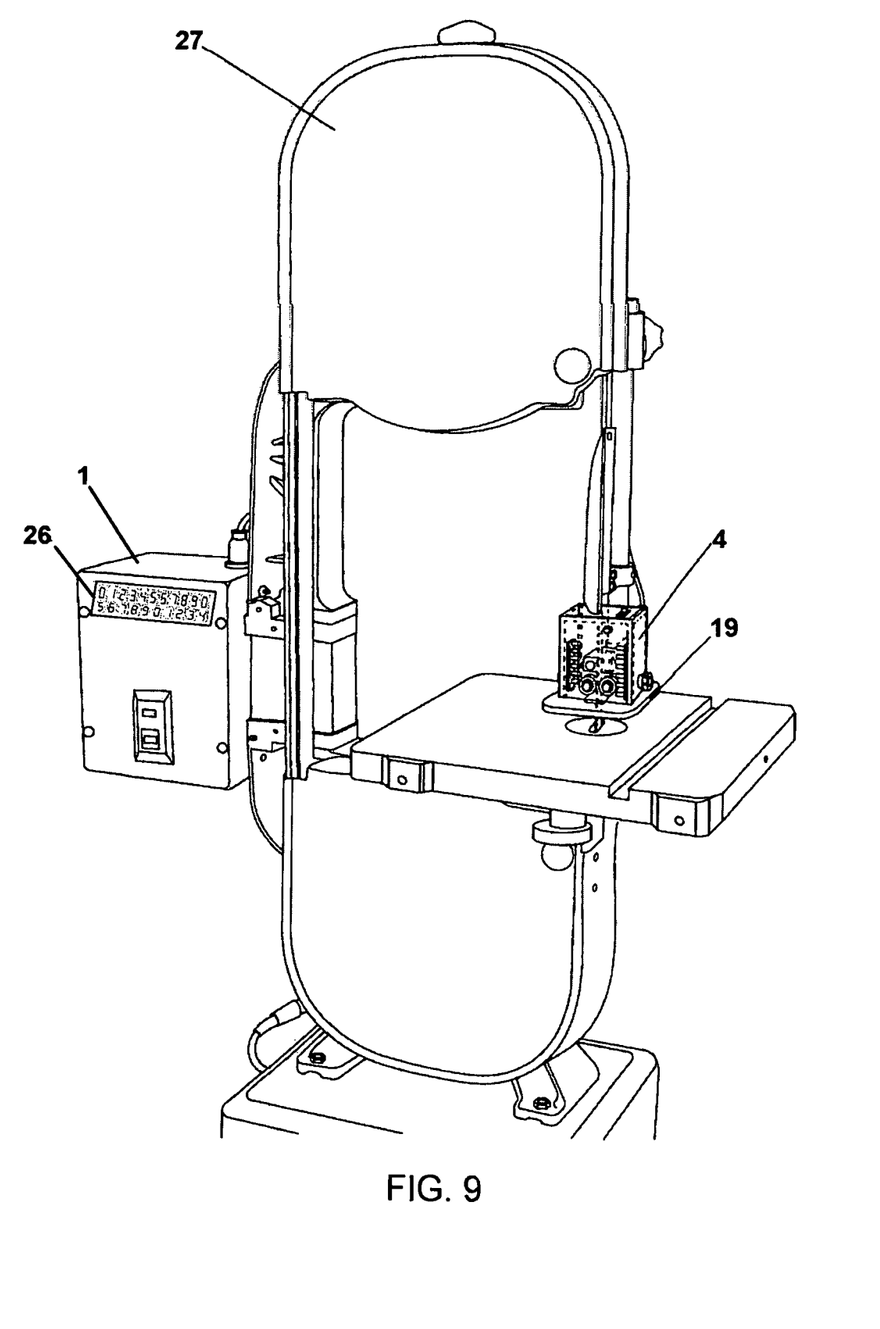
FIG. 9 depicts an exemplary band saw under control of the invention.

FIG. 9 depicts the machine control and data logging system (1) installed to control an exemplary band saw (27). An exemplary operator display module (26) is included. The machine guard (4) with proximity/touch sensor (19) is also shown.

Figure 10:
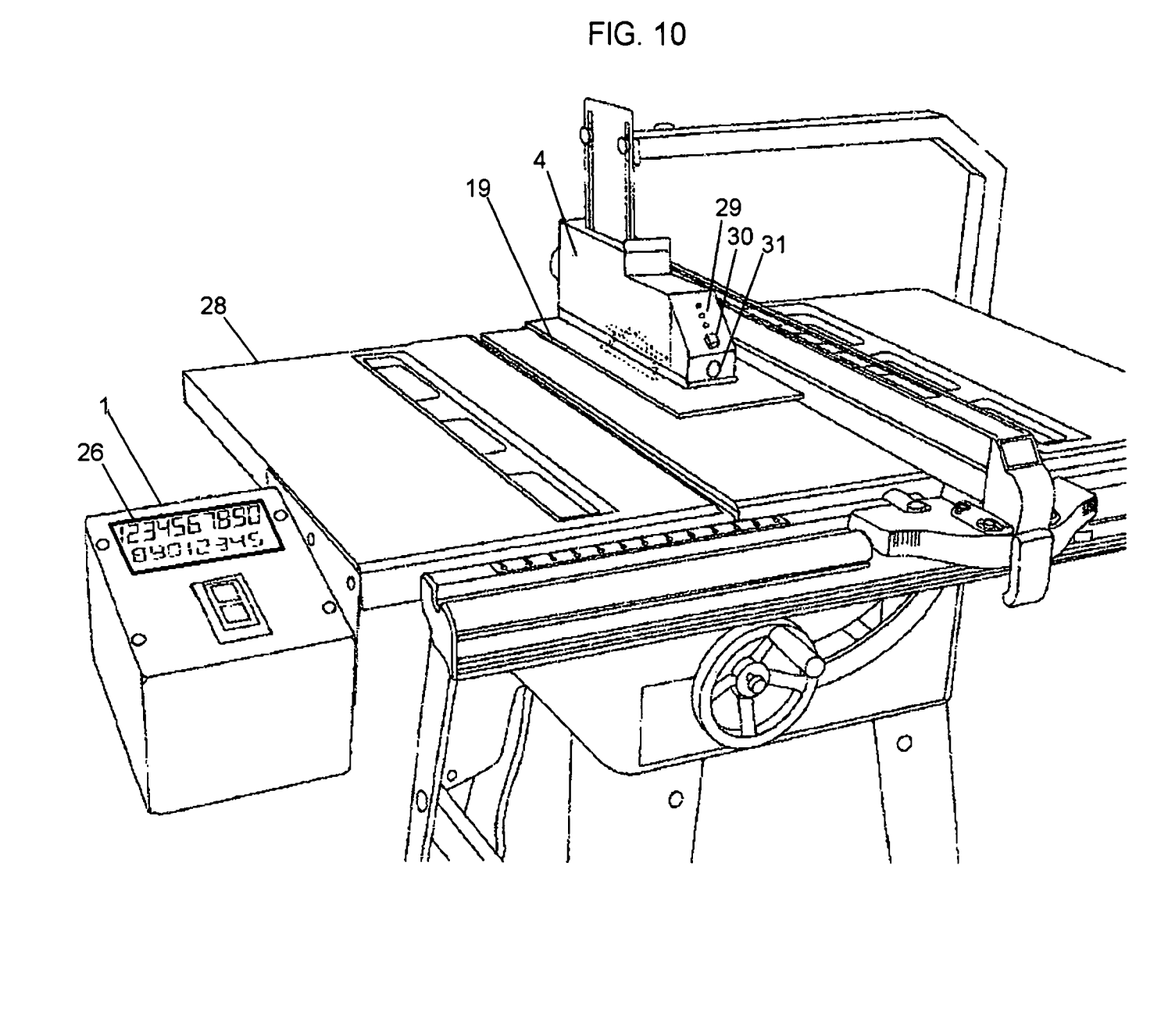
FIG. 10 is an exemplary table saw under control of the present invention.

FIG. 10 depicts a machine control and data logging station (1) controlling a table saw (28). The blade guard (4), proximity/touch sensor (19), and operator display (26) are also shown. Machine state indicators (29), Operator ARM pushbutton switch (30) and blade light switch (31) are also shown.

Those having ordinary skill in the data logging art will appreciate that numerous modifications, refinements and technical updates to components are possible, within the scope of the inventive concept. Therefore, the invention is not limited to the specific embodiments described above, but rather is defined by the following claims.

What is claimed is:

1. A machine control and data logging station adapted to monitor at least one machine tool, hazardous to a human operator, selected from the group consisting of a table saw, rotary saw, a band saw, a broaching machine, a sheet metal shear, and a planer, said logging station comprising:
   at least a programmable digital event recorder to monitor operation of said
   machine tool;
   a programmable microcontroller (8);
   a source of battery backup power, capable of maintaining, for a period of at least 30 days, a chronological record of operation of said machine tool in a tamper-resistant storage memory (9);
   a source of signals representing clock data;
   a blade enclosure configured to enclose at least a portion of said machine tool, wherein the blade enclosure includes a touch sensor communicatively coupled to the programmable microcontroller, said touch sensor configured to detect a user in contact with the blade enclosure;
   a plurality of sensors (13) capable of detecting and signaling operating parameters selected from: chronological time; temperature)(F.° C.° K°); liquid pressure; gas pressure; linear motion speed (FPS/MPS); rotational speed (RPM); operator ID, touch sensor; moisture; liquid; acceleration; weight; incline; voltage; current resistance; magnetism; position; proximity; vibration; optical; force; audio; dust; and
   at least one logging device adapted to record the foregoing sensor output data and clock data in the tamper-resistant storage memory (9), whose content is secured (8) to prevent unauthorized modification of any chronological record of machine tool operation, recorded in said digital event recorder
   wherein the programmable microcontroller is configured to perform an emergency stop when the touch sensor detects the user in contact with the blade enclosure.

2. The station of claim 1, further comprising:
   at least one input at said microcontroller (8) which, during operation of said machine tool, receives configuration data from safety guards (4), sensors (5, 19, 20), and operator controls (14, 30, 31); and
   at least one display (26) which provides safety directions and information to an operator of the machine.

3. The station of claim 1, further comprising a transceiver to transmit and receive data and instructions between said logging station and a remotely-located computing device.

4. The station of claim 3, wherein said transceiver is adapted (15, 16) to receive an instruction from said remote computing device to freeze or deactivate at least one component (6, 22) of said machine.

5. The station of claim 3, further comprising a module for encrypting data, prior to transmission from said station, and a module for decrypting data, received at said station.

6. The station of claim 1, further comprising a monitoring device, including a machine guard (4) and at least one sensor (19) coupled to an input of said microcontroller (5).

7. The station of claim 1, wherein the at least one logging device is further configured to record data related to the emergency stop in the tamper-resistant storage memory.

* * * * *